L. D. WYATT.
Corn Planter.
No. 84,075.
Patented Nov. 17, 1868.
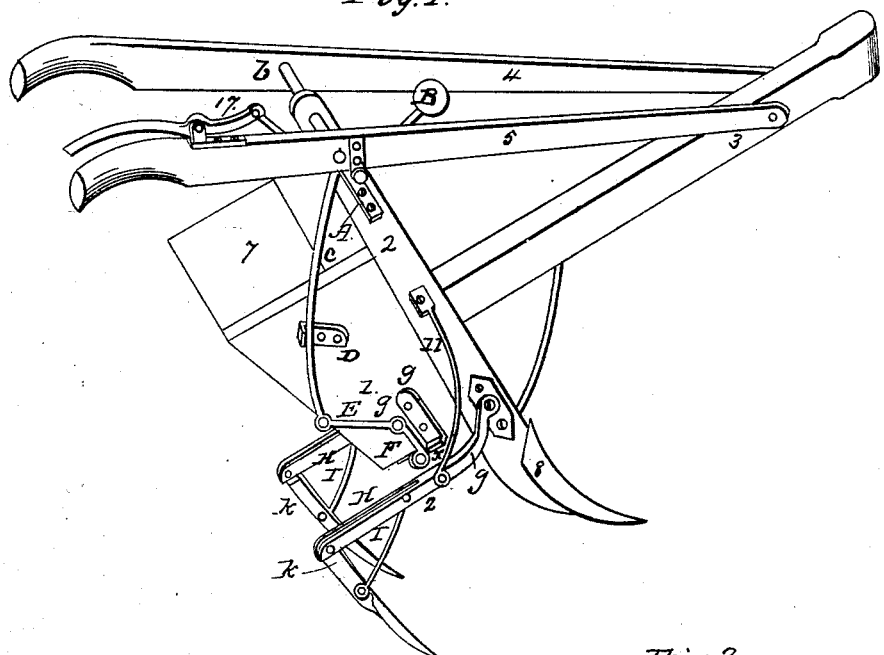
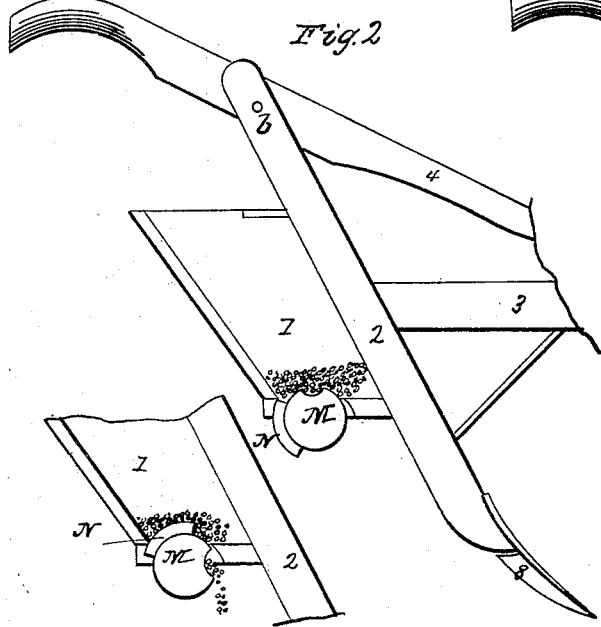
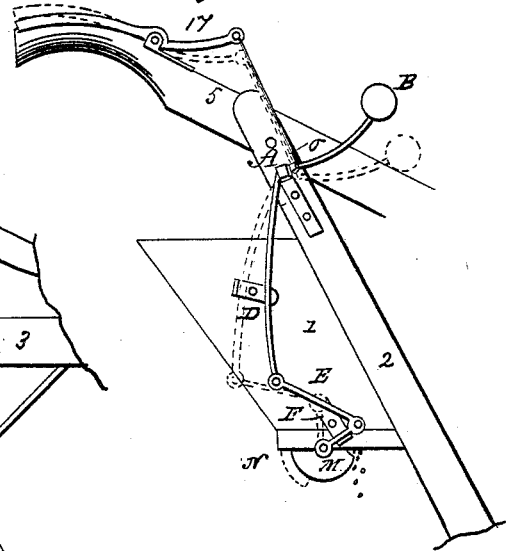
Witnesses
Samuel Farley
E. J. McManama
Inventor
Lorenzo D. Wyatt

LORENZO D. WYATT, OF CASTLETON, INDIANA, ASSIGNOR TO HIMSELF, SAMUEL FARLEY, AND EDWARD McMANAMA.

Letters Patent No. 84,075, dated November 17, 1868.

IMPROVEMENT IN CORN-PLANTERS.

The Schedule referred to in these Letters Patent and making part of the same.

*To all whom it may concern:*

Be it known that I, LORENZO D. WYATT, of Castleton, Marion county, State of Indiana, have made certain Improvements of T. T. Shawcross's Corn-Planter, patented October 2, 1866, issued to Shawcross, Wyatt, and McManama; and I do hereby declare that the following is a full and exact description thereof, reference being had to the accompanying drawings, and to the letters of reference marked thereon, of which—

Figure 1 represents a perspective view.

Figures 2 and 3, details and sections.

My improvements consist, first, in applying the weight B to the old arrangement for dropping corn, and changing the arrangement itself, so that, by the pressure upon the lever 17, the weight B rises up, and pushes levers C and E forward. The lever F, being attached to lever E, is pushed out of its position and upon lever-stop $x$.

The axle of the little wheel M being firmly attached to this lever F, is turned so as to drop the corn, as shown in fig. 3.

When the pressure is taken off from the lever 17, the gravity of the weight B pushes the lever C back against the stop D, and brings levers E and F in such a position as to bring the cavity of the little wheel M to the inside of the box 1, as shown in fig. 1 and fig. 3, red marks.

By this arrangement I overcome the objection to the old arrangement, namely, the pushing open of the corn-box 1, by stalks, stumps, &c., striking against the lever 13 of old planter.

To prevent the objectionable feature of catching of corn in the box by the agitator, I construct a new agitator, "rim-like," and attach it to the little wheel in such a manner that its lower end never passes the inside of the bottom of the box 1, avoiding the possibility of catching corn.

I do not claim any portion or part of the old corn-planter; but

What I do claim, and desire to secure by Letters Patent of the United States, is—

The arrangement A, B, C, D, E, F, and G, and the agitator N, all arranged and operating substantially as described, for that purpose.

LORENZO D. WYATT.

Witnesses:
SAMUEL FARLEY,
ED. McMANAMA.